March 27, 1956 D. W. LEWIS ET AL 2,739,638

RESINOUS SILICON-CONTAINING COMPOSITIONS
AND PRODUCTS PRODUCED THEREWITH
Filed July 6, 1954

WITNESSES:
E. A. McCloskey
William G. Liddicoat

INVENTORS
Daniel W. Lewis
and Harold M. Philofsky.
BY
Frederick Shapoe
ATTORNEY

United States Patent Office 2,739,638

Patented Mar. 27, 1956

2,739,638

RESINOUS SILICON-CONTAINING COMPOSITIONS AND PRODUCTS PRODUCED THEREWITH

Daniel W. Lewis and Harold M. Philofsky, Pittsburgh, Pa., assignors to Westinghouse Electric Corporation, East Pittsburgh, Pa., a corporation of Pennsylvania Application July 6, 1954, Serial No. 441,374

5 Claims. (Cl. 154—2.6)

Figure 1:
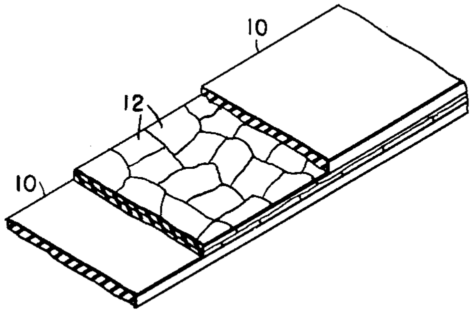

The present invention relates to electrical insulation and has particular reference to resinous silicon-containing compositions which are suitable for use as bonding materials in the manufacture of mica tapes and wrappers and as insulation for application to electrical apparatus including windings, conductors, coils, and the like.

Mica tapes and wrappers, as used for electrical insulation, consist of a layer of mica flakes united with a bonding material. Usually the mica flakes are sandwiched between relatively thin sheets of paper, cloth or resin films, or the like, called backing members. The bonding material, to be completely satisfactory, must be sufficiently viscous and tacky to bond the mica flakes and backing members together during the operation of applying or winding the tape upon an electrical coil or the like and yet not so viscous as to render the tape too stiff for manipulation and tight fit against the coil. It is also essential that the mica bonding material be compatible with the impregnating or dipping varnishes, or encapsulating resinous insulating materials applied to the electrical apparatus embodying such mica taped coils. When the resinous materials are incompatible, a full and proper cure of the applied varnishes or other insulating materials is inhibited or not attained.

In many applications throughout the electrical industry there is an urgent need for resinous insulating materials that do not decompose, crack, flow or otherwise fail at the high temperatures frequency encountered over long periods of time in the service of electrical equipment. The uncured resinous materials employed as insulation on such equipment ideally should have a viscosity such that they can be employed in conventional dipping, impregnating, encapsulating, and like operations. Moreover, the uncured resinous insulating material desirably should have a long shelf life yet set up in the electrical apparatus, within a relatively short period of time and at reasonably low temperatures, to a thermoset resinous material which is free of voids, cracks, or like mechanical defects. Since mechanical defects in electrical insulation are obviously undesirable, it is often essential that no volatile solvent or the like be present in the uncured resinous composition and that the thermosetting reaction take place without the evolution of volatile products.

The object of the present invention is to provide resinous silicon-containing compositions which, when applied to electrical apparatus, provide insulating material therefor having outstanding physical and electrical properties.

Another object of the present invention is to provide a silicone resin which will function as an improved bonding material in the preparation of mica tapes and wrappers.

A further object of the invention is to provide electrical apparatus solidly impregnated with a cured, solid resinous siloxane composition.

Another object of the invention is to provide electrical apparatus encapsulated within a cured, solid resinous siloxane composition.

Figure 2:
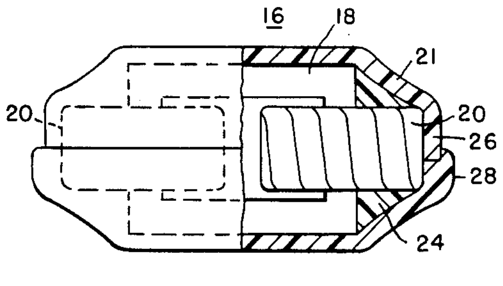

To indicate more fully the advantages and capabilities of the present invention, together with other and further objects thereof, reference is made to the following description taken in conjunction with the accompanying drawing wherein:

Figure 1 is a fragmentary view in perspective of a tape having mica flakes sandwiched between backing members and bonded thereto with a composition of this invention; and Fig. 2 is a vertical view, partly in cross-section, showing a transformer impregnated with and encapsulated within compositions of this invention.

It will be understood that embodiments of the invention, other than those illustrated and described, employing the same or equivalent principles may be used and that structural changes may be made as desired without departing from the true scope of the invention.

In accordance with this invention and in the attainment of the foregoing objects there are provided polymerizable resinous compositions which comprise the product obtained by hydrolyzing a mixture of monomers, one of which is (1) an organosilicon monomer having a phenylene group bonded directly to two silicon atoms, each of the silicon atoms having two monovalent saturated hydrocarbon radicals and one monovalent hydrolyzable group attached directly thereto, and another of which is (2) an organosilicon monomer having a monovalent olefinically unsaturated hydrocarbon radical, two monovalent hydrolyzable groups, and a monovalent saturated hydrocarbon radical attached directly to a silicon atom.

More specifically, there are provided polymerizable resinous compositions which comprise the product obtained by hydrolyzing a mixture of monomers comprising a monomer embodying the group

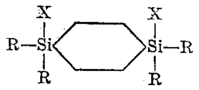

wherein R represents saturated hydrocarbon groups and X represents hydrolyzable groups, and a monomer embodying the group

wherein X represents hydrolyzable groups, Y represents an olefinic radical and R represents a saturated hydrocarbon radical.

The saturated hydrocarbon radicals represented by R in the formulae set forth above, may be either aliphatic, including methyl, ethyl, propyl, isopropyl, and the like, or aromatic, including benzyl, phenyl, and the like.

The olefinic radical represented by Y in the second formula set forth above, may be a vinyl, allyl, vinyl phenyl, or like group.

The hydrolyzable groups, represented by X in the above formulae, may be either alkoxy, aryloxy, halogeno or amino groups. When the hydrolyzable group is an alkoxy material, the alkyl radical may be either primary, secondary or tertiary, for example methyl, ethyl, propyl, butyl, isopropyl, isopropyl butyl, secondary butyl, tertiary butyl, amyl, hexyl, and the like. When the hydrolyzable group is an aryloxy group, the aryl radical may be a phenyl group or substituted phenyl group. In place of the alkoxy or aryloxy groups just described, any of the halogens or an amino group may be used. It is preferred to use those materials in which the hydrolyzable groups comprise alkoxy groups in which the alkyl radical is primary and contains from 1 to 8 carbon atoms per molecule.

An organosilicon monomer having a phenylene group bonded directly to two silicon atoms which has been found to be particularly suitable for use in accordance with this invention is 1,4-bis-(ethoxydimethylsilyl)benzene. This material may be prepared according to the following reaction:

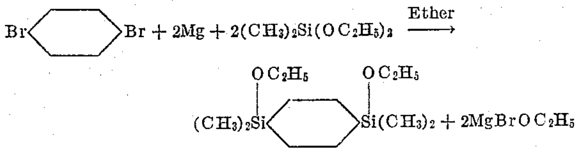

As a specific example, the reaction is carried out by warming about 50 cc. of an ethyl ether solution containing about 25 grams of p-dibromobenzene and 292 grams of magnesium in a suitable vessel. A solution containing 1,155 grams of p-dibromobenzene and 1,480 grams of diethoxydimethylsilane dissolved in 975 cc. of ethyl ether then are added to the ether solution in the vessel at a rate such as to maintain gentle reflux. Precipitated salts are filtered out and the filtrate is distilled to yield about 565 grams of crude 1,4-bis-(ethoxydimethylsilyl)-benzene which, on redistillation, gives a product having a boiling point of about 123–125° C. at a pressure of 3.5 millimeters of mercury; a density of about $D^{25}$ 0.9411; and an index of refraction of about $n_D^{25}$ 1.4748.

The organosilicon monomer just described which has a phenylene group bonded directly to two silicon atoms is hydrolyzed with at least one other organosilicon monomer having two hydrolyzable groups, an olefinic radical, and a saturated hydrocarbon group attached directly to a silicon atom. Examples of such other monomers include, diethoxyvinylphenylsilane, diethoxyvinylmethylsilane, diethoxydimethylsilane, and diethoxymethylphenylsilane. Such other organosilicon monomers may be used in amounts within the range of 25 to 0.5 mols per mol of the phenylene-containing monomer.

The mixture of organosilicon monomers just described is converted to a thermoset resinous composition (suitable for use as mica bonds, electrical insulation and the like) by hydrolyzing and condensing the monomers to intermediate organopolysiloxanes, at which point the product is a liquid, and then polymerizing or cross-linking the intermediate siloxanes by heating the same in the presence of one or more vinyl addition type polymerization catalysts.

The monomers may be hydrolyzed in any convenient manner as, for example, by dissolving the same in a volatile organic solvent and then agitating the resultant solution in the presence of a hydrolytic agent.

Examples of suitable hydrolytic agents include water, aqueous solutions of inorganic acids such as dilute sulphuric acid, and dilute hydrochloric acid, and aqueous solutions of organic acids such as dilute picric acid.

The hydrolytic reaction preferably is carried out in the presence of a liquid organic material in which the monomers and the resultant hydrolytic products are soluble. Examples of suitable organic solvent materials include benzene, toluene, xylene, diethyl ether, methanol, ethanol, propanol and the like. The amount of solvent employed is not critical, however, the more dilute the solution the less viscous will be the resulting hydrolytic product comprising the intermediate organopolysiloxanes.

The intermediate organopolysiloxanes are oily fluids and may be polymerized or cross-linked to solid thermoset resins by heating the same to about 100° to 130° C. for about one to four hours in the presence of one or more vinyl addition type polymerization catalysts. Suitable examples of such catalysts include benzoyl peroxide, lauroyl peroxide, methyl ethyl ketone peroxide, t-butyl hydroperoxide, di-t-butyl peroxide, ascaridole, tert-butyl perbenzoate, di-t-butyl diperphthalate, and ozonides. The catalysts generally should be used in an amount of from 0.1% to 2% by weight, although somewhat larger or smaller amounts may be employed if desired. Polymerization accelerators such as cobalt naphthenate and azomethines also may be employed. Polymerization also may be effected through the utilization of actinic light.

While their use is not essential, a relatively small proportion of one or more polymerization inhibitors may be incorporated in the hydrolyzed product to aid in extending its storage or shelf-life by preventing premature polymerization. Inhibitors which are suitable for this purpose include substituted phenols and aromatic amines. More specific examples of suitable polymerization inhibitors include hydroquinone, resorcinol, tannin, and sym. alpha, beta naphthyl-p-phenylene diamine, and N-phenyl beta naphthyl amine. The inhibitor, if employed, should be present in only relatively small proportions. Thus, amounts less than about 1.0% should be used, with amounts as small as about 0.01% to about 0.1% generally being sufficient.

The utilization of an organosilicon monomer having a phenylene group bonded directly to two silicon atoms is essential for the preparation of satisfactory thermoset resins in accordance with this invention. Thus, a mixture of monomers in accordance with this invention including 1,4-bis(ethoxydimethylsilyl)benzene was hydrolyzed with dilute sulphuric acid to form an organopolysiloxane. This material was converted to a thermoset resin by mixing the same with about 1% of t-butylperbenzoate and heating to a temperature of about 110° C. for a period of about one hour. Separate samples of this resin were aged at 200° C. for over three months and at 250° C. for over two months, in both cases, without showing any signs of mechanical breakdown. The weight losses in these samples after aging for ten days at 200° C. was only about 3%. After aging for thirty days at this temperature the weight loss was only about 5%. The slight differences in the densities of the organopolysiloxane oil and the resin obtained therefrom indicates that very little shrinkage occurs during curing. Thus, the density of the organopolysiloxane oil at 28° C. was 1.030 grams per cc. while that of the resin was 1.051 grams per cc. after aging for 23 hours at 200° C. After having been aged at this temperature for 65 hours the density of the resin was 1.069 grams per cc.

The importance of the utilization of a silicon monomer having a phenylene group directly bonded to two silicon atoms is illustrated by the fact that a composition having a formula similar to that just discussed was prepared wherein a different difunctional monomer, namely, diethoxyphenylmethylsilane, was used in place of the phenylene monomer. The organopolysiloxane oil obtained on hydrolysis of this last mixture, when catalyzed with tertiary butyl perbenzoate, did not set up even after several days aging at 110° C. Thermosetting was induced by subjecting the oil to a considerably higher temperature. However, after aging at 200° C. for eleven days the resin was found to have suffered a weight loss of 11% as compared with a weight loss of only 3% for the resin of this invention, containing the phenylene group, under the same test conditions.

To illustrate even more fully the advantages and capabilities of the invention the following examples of the preparation of resinous compositions are set forth. The parts given are by weight unless otherwise indicated.

EXAMPLE I

A mixture of 37.5 parts of diethoxyphenylvinylsilane, 30 parts of diethoxydimethylsilane and 81.2 parts of 1,4-bis-(ethoxydimethylsilyl)benzene was dissolved in about 165 parts of benzene contained in a vessel. The vessel was placed in an ice bath and cooled to 0° C. The solution was hydrolyzed by adding about 100 parts of 80% sulphuric acid while stirring vigorously over a period of about one hour. The solution was removed from the ice bath and stirred for an additional hour, crushed ice being added near the end. The benzene solution containing the condensate was permitted to separate out and the acid-water layer was discarded. Free acid was washed from the benzene solution by treatment with sodium bicarbonate. Water and benzene were then removed by evaporation using heat and vacuum, leaving about 80 parts of a polymerizable intermediate organosiloxane fluid having a viscosity of 6 poises at 25° C. The viscosity of this material was such that when mixed with a catalyst and heated, it could be used as an impregnating resin, potting material, or the like.

By further treating this oil with concentrated sulphuric acid an oil of higher viscosity is obtainable which can be used directly as a mica bond or in conventional encapsulation procedures, and thereafter cured. Thus, the viscosity of this 6 poise oil was increased by dissolving 75 parts thereof in 75 parts of benzene and retreating the solution with 80% sulphuric acid. The oil thus obtained had a viscosity of 5400 poises at 25° C. A sample of this latter polymerizable oil containing 1.7% by weight tertiary butyl perbenzoate gelled to a thermoset resin in about 45 minutes at 110° C. Samples cast in No. 16 test tubes to a depth of one inch and in aluminum dishes to a depth of 3/16 inch were aged at 200° C. for over two months before showing any signs of mechanical breakdown. This higher viscosity oil had characteristics including tackiness, thermal stability, and the like which, when used with a catalyst and heated, made it an excellent material for use as a mica bond and an encapsulating resin.

EXAMPLE II

A solution of 21 parts of diethoxyphenylmethylsilane, 16 parts of diethoxymethylvinylsilane, and 28 parts of 1,4-bis-(ethoxydimethylsilyl)benzene in 100 parts of benzene was cooled to 0° C. and treated with 50 cc. of cold 80% sulfuric acid. The mixture was stirred while at 0° C. for one hour and then for an additional one hour at 25° C. About 300 cc. of ice were added after which the benzene layer which separates was withdrawn and washed free of acid by treatment with $NaHCO_3$ and dried using anhydrous sodium sulfate. Benzene was removed by heating the mixture under vacuum. The oily fluid organopolysiloxane polymerized to a thermoset resin upon heating at a temperature of about 135° C. for a period of about 2 hours in the presence of 1% benzoyl peroxide. The material is suitable for use as an encapsulating resin.

EXAMPLE III

About 44 parts of diethoxyphenylvinylsilane, 29 parts of diethoxydimethylsilane, and 56 parts of 1,4-bis-(ethoxydimethylsilyl)benzene were dissolved in 250 parts of benzene and hydrolyzed with 80% sulphuric acid according to the procedure described in Example I. There was obtained a polymerizable fluid polysiloxane having a viscosity of 10 poises at 25° C. This fluid, like the low viscosity polysiloxane of Example I, was well suited for use as an impregnant and potting material. A portion of this fluid was introduced into suitable molds and converted to a thermoset voidless resin by heating for two hours at 110° C. in the presence of 1.5% tertiary butyl perbenzoate. After aging for 12 days at 200° C. the thermoset resin lost only 3% of its weight.

To alter the viscosity of a portion of the intermediate polysiloxane fluid of this Example III, about 20 parts thereof were dissolved in 100 parts benzene to which was added 0.4 part of solid potassium hydroxide. The mixture was refluxed for five hours to yield an oily fluid which, after the removal of benzene, had a viscosity of 209 poises at 25° C. It gelled in 50 minutes at 110° C. when catalyzed with 1.7% tertiary butyl perbenzoate. The resin had a weight loss of only 2.6% after aging at 200° C. for 12 days. Like the high viscosity fluid of Example I, this last fluid polysiloxane was suitable for use as a mica bond or as an encapsulating resin.

EXAMPLE IV

Following the procedure described in Example I, a fluid intermediate polysiloxane was prepared by the sulphuric acid hydrolysis of a solution of 0.1 mole of diethoxyphenylvinylsilane, 0.1 mole of diethoxydimethylsilane and 0.133 mole of 1,4-bis-(ethoxydimethylsilyl)benzene in 125 parts of benzene. The fluid product had a viscosity of 15 poises at 25° C. It was converted to a thermoset resin in about 1½ hours after being heated at a temperature of 110° C. in the presence of benzoyl peroxide. The cured resin had a weight loss of 3% after being aged at 200° C. for ten days. A portion of this resin remained crack-free for two months at 250° C. The fluid organopolysiloxane has a viscosity such that it may be used conveniently for impregnating motor coils, and like electrical members.

EXAMPLE V

Using the 80% sulphuric acid method of hydrolysis, an intermediate fluid polysiloxane was prepared from 260 gms. of diethoxyphenylvinylsilane, 208 gms. diethoxydimethylsilane, and 564 gms. of 1,4-bis-(ethoxydimethylsilyl)benzene. The fluid product weighing 628 grams, had a viscosity of 20 poises at 25° C. Its density was 1.031 gm./cc. at 28° C. A sample catalyzed with 1% tertiary butyl perbenzoate gelled in 1½ hours at 110° C. After one day at 200° C. the weight loss was 1.7% and the density of the resin was 1.061 gm./cc. at 28° C. After three days at 200° C. the resin had a total weight loss of only 2.8% and a density of 1.069 gm./cc. This resin has a viscosity such that it can be used conveniently for impregnating motor and generator coils and similar electrical windings.

A sample of this resin aged in an aluminum dish for three days at 200° C. had the electrical properties set forth in Table I.

*Table I*

| Frequency | 100×tan δ | | | Dielectric Constant | | |
|---|---|---|---|---|---|---|
| | 25° C. | 100° C. | 150° C. | 25° C. | 100° C. | 150° C. |
| 60 cy./sec | 0.27 | 0.03 | 0.25 | 2.77 | 2.56 | 2.42 |
| 1 Kcy./sec | 0.45 | 0.03 | 0.06 | 2.75 | 2.56 | 2.42 |
| 100 Kcy./sec | 0.72 | 0.21 | 0.10 | 2.70 | 2.56 | 2.42 |
| 1.2 Mcy./sec | 0.86 | 0.84 | 0.26 | 2.68 | 2.55 | 2.41 |
| 48 Mcy./sec | 1.08 | 0.73 | 0.60 | 2.64 | 2.54 | 2.38 |

In addition to being polymerizable in the manner described above and illustrated in Examples I–IV, the hydrolyzed and condensed intermediate polysiloxane fluid may be copolymerized by dissolving from 5% to 95% of the same in from 95% to 5% of a liquid reactive unsaturated monomer having the group >C=C<. Upon heating in the presence of a vinyl-type addition catalyst the solution will set up in the form of a hard, cured thermoset resin.

Examples of liquid reactive unsaturated monomers having the group >C=C< which are suitable for use in accordance with this invention, include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, methallyl alcohol, acrylonitrile, methyl vinyl ketone, diallyl ether, butyl methacrylate, allyl acrylate, allyl crotonate, 1,3-chloroprene, and divinyl benzene, as well as mixtures of any two or more of these monomers.

The following example illustrates the preparation of such a copolymerized resin.

EXAMPLE VI

About 75 parts of the high viscosity polysiloxane fluid prepared as disclosed in the latter part of Example I are dissolved in about 25 parts of monostyrene. The resulting solution is heated to a temperature of about 135° C. in the presence of benzoyl peroxide for about one hour whereupon it is converted to a thermoset resin.

The exceptionally good thermal stability and high mechanical strength characteristics of the polymerizable and copolymerizable resinous compositions of this invention make the same particularly well suited for use as impregnating, dipping encapsulating and the like varnishes well adapted for electrical insulating purposes, and these materials are particularly efficacious in the preparation of mica tape, resin impregnated sheet materials including laminates, and the like.

To illustrate more fully the advantages of the present invention, reference now will be made to the accompanying drawing.

Fig. 1 illustrates, in perspective, a piece of mica tape having a pair of thin backing members 10. The members 10 may be formed from fibrous material, such as glass fibers, asbestos, or the like, or synthetic films such as polyethylene glycol terephthelate. Mica flakes 12 are disposed between the members 10 and bonded thereto by the polymerized resinous composition of this invention.

One convenient method for manufacturing mica tape comprises unwinding a roll of glass fabric about 0.005 inch thick onto a moving belt. Mica flakes are laid or showered on the glass cloth. The resinous composition of this invention, dissolved in a solvent, such as benzene, toluene, or acetone (the resin constituting about 20% by weight, of the solution) is introduced onto the flakes and glass cloth from a drip pan suspended over the moving belt. A top roll of glass fabric then is unwound into place on top of the flakes, and the resulting sandwich is then pressed and passed through an oven or over heated rolls to drive off the solvent. The sandwich is then cut into tapes or wrappers of desired width.

In Fig. 2, there is illustrated a transformer 16 having a magnetic core 18 and coils 20. A relatively thick encapsulating layer or coating 21 of a more viscous composition of this invention, such as that of the latter part of Example I, is applied about the exterior surface of the transformer and cured to a hard resinous capsule. The coating 21 has mica or other finely divided inorganic flake-like material incorporated therein in an amount sufficient to impart thixotropic properties thereto. An impregnating material 24, comprising a low viscosity fluid polysiloxane composition of this invention, completely fills the interstices of the transformer and all voids within the outer coating 21. In this latter instance, mica is not incorporated in the composition since maintaining the low viscosity is desired.

One method for applying the encapsulating and impregnating compositions of this invention to the transformer 16 comprises introducing the transformer into a quantity of the mica-containing composition to a depth such that a major proportion of the transformer 16 and the coils 20 are covered. The transformer 16, with a coating 26 of the mica-containing composition adhering thereto, then is placed in a baking oven and heated to cause the composition to polymerize into a hard, thermoset material and provide an imperforate layer about a major proportion of the transformer 16 closely conforming to the surface contour thereof. The transformer 16 then is placed with the uncoated end being up in an impregnating tank which is filled with a low viscosity, mica-free impregnating composition of this invention. The composition will flow into the shell or coating 26 about transformer 16 and penetrate freely and deeply therein, filling all the interstices. The impregnated transformer then is placed in a baking oven where the impregnating composition is caused to polymerize into a solid thermoset impregnant.

The partially encapsulated and impregnated transformer 16 then is inverted and positioned in the tank containing the mica-containing composition in such manner that the composition coats the previously uncoated surface, so that it overlaps the original coating 26. The transformer then is baked whereby the last applied coating of the composition polymerizes into a solid thermoset overlapping encapsulating layer 28.

Encapsulating procedures other than that described may be carried out using the compositions of this invention. Thus, electrical apparatus also may be encapsulated, using the present compositions, according to the process disclosed in U. S. application Serial No. 225,808, copending herewith.

The compositions of this invention may be admixed with up to equal amounts, by weight, of various solid fillers such as silica, chopped glass fibers, asbestos fibers, iron oxide, titanium dioxide, clays such as bentonite and kaolin, inorganic silicates, and graphite.

While the present invention has been described with reference to particular embodiments and examples, it will be understood, of course, that modifications, substitutions, changes and the like may be made therein without departing from the true scope of the invention.

We claim as our invention:

1. A polymerizable resinous composition comprising the product obtained by hydrolyzing a mixture of monomers, one of which is (1) an organosilicon monomer having a phenylene group bonded directly to two silicon atoms, each of the silicon atoms having two monovalent saturated hydrocarbon radicals and one monovalent hydrolyzable group attached directly thereto, and another of which is (2) an organosilicon monomer having a monovalent olefinically unsaturated hydrocarbon radical, two monovalent hydrolyzable groups and a monovalent saturated hydrocarbon radical attached directly to a silicon atom.

2. An insulated electrical member comprising an electrical conductor and a solid thermoset resinous material disposed within the interstices of the electrical member completely filling the same, the solid thermoset resinous material comprising the product obtained by hydrolyzing a mixture of monomers, one of which embodies the group

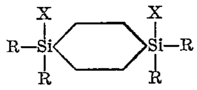

wherein R represents saturated hydrocarbon groups and X represents hydrolyzable groups and another of which embodies the group

wherein X represents hydrolyzable groups, Y represents an olefin, and R represents a saturated hydrocarbon, and heating the hydrolyzed monomers to cause the same to polymerize in the form of a thermoset resinous composition.

3. An insulated electrical member comprising an electrical conductor and a layer of solid thermoset resinous material applied to the exterior surface thereof, said solid thermoset resinous material comprising the product obtained by hydrolyzing a mixture of monomers, one of which embodies the group

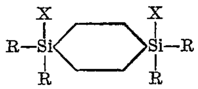

wherein R represents saturated hydrocarbon groups and X represents hydrolyzable groups, and another of which embodies the group

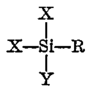

wherein X represents hydrolyzable groups, Y represents an olefin, and R represents a saturated hydrocarbon, and heating the hydrolyzed monomers to cause the same to polymerize in the form of a thermoset resinous composition.

4. An insulated electrical member as set forth in claim 3, wherein the solid thermoset resinous material has finely divided inorganic flake-like material incorporated therein in an amount sufficient to impart thixotropic properties to the resinous material.

5. A tape comprising a backing member, a layer of mica flakes applied to the member, and a cured thermoset resinous material bonding said flakes to the backing member, said resinous material comprising the product obtained by hydrolyzing a mixture of monomers, comprising a monomer embodying the group

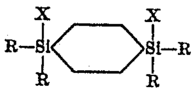

wherein R represents saturated hydrocarbon groups and X represents hydrolyzable groups and a monomer embodying the group

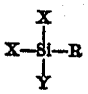

wherein X represents hydrolyzable groups, Y represents an olefin, and R represents a saturated hydrocarbon, and heating the hydrolyzed monomers to cause the same to polymerize in the form of a thermoset resinous composition.

References Cited in the file of this patent

UNITED STATES PATENTS

| | | |
|---|---|---|
| 2,432,891 | Hervey | Dec. 16, 1947 |
| 2,443,663 | Rider et al. | June 22, 1948 |
| 2,542,827 | Minter | Feb. 20, 1951 |
| 2,561,429 | Sveda | July 24, 1951 |
| 2,562,004 | Watson et al. | July 24, 1951 |
| 2,645,628 | Hurd | July 14, 1953 |
| 2,656,290 | Berberich et al. | Oct. 20, 1953 |